US012226780B1

(12) United States Patent
Hauke

(10) Patent No.: US 12,226,780 B1
(45) Date of Patent: Feb. 18, 2025

(54) IMPACT MILL WITH STRIKE PLATES

(71) Applicant: Urban Mining Industries, LLC, New Rochelle, NY (US)

(72) Inventor: Dale Hauke, Northlake, TX (US)

(73) Assignee: Urban Mining Industries, LLC, New Rochelle, NY (US)

( * ) Notice: Subject to any disclaimer, the term of this patent is extended or adjusted under 35 U.S.C. 154(b) by 78 days.

(21) Appl. No.: 17/201,520

(22) Filed: Mar. 15, 2021

(51) Int. Cl.
*B02C 13/09* (2006.01)
*B02C 13/282* (2006.01)
*B02C 13/30* (2006.01)
*B02C 23/02* (2006.01)

(52) U.S. Cl.
CPC ............ *B02C 13/09* (2013.01); *B02C 13/282* (2013.01); *B02C 13/30* (2013.01); *B02C 23/02* (2013.01)

(58) Field of Classification Search
CPC . B02C 17/22; B02C 2013/2825; B02C 2/005; B02C 13/09; B02C 23/00; B02C 17/225; B02C 23/02
See application file for complete search history.

(56) References Cited

U.S. PATENT DOCUMENTS 764,715 A * 7/1904 Descamps ............... B02C 17/22 241/183
2,999,652 A * 9/1961 Dear ....................... B02C 13/09 241/275
4,046,326 A * 9/1977 Larsen .................... B02C 17/22 241/182
5,154,363 A 10/1992 Eddy
5,368,243 A 11/1994 Gold
7,419,109 B1 9/2008 Ronfeldt
9,724,700 B2 8/2017 Farr
2017/0355526 A1* 12/2017 Baric ...................... B32B 3/266

FOREIGN PATENT DOCUMENTS

CN 106111271 A * 11/2016 ............. B02C 17/22
CN 109046591 A * 12/2018

OTHER PUBLICATIONS

English translate (CN106111271A), retrieved date Oct. 18, 2022.*
English translate (CN109046591A), retrieved date Oct. 18, 2022.*

* cited by examiner

*Primary Examiner* — Mohammed S. Alawadi
(74) *Attorney, Agent, or Firm* — Gordon & Jacobson, P.C.

(57) ABSTRACT

A mill system for reducing the material size of input material, the system including a plurality of strike plates, preferably of ceramic, embedded within an interior layer of a housing, wherein the interior layer includes tiles made preferably of ceramic; a rotor having one or more rotor blades; a driveshaft; and a motor; wherein the motor powers the drive shaft to rotate the rotor; wherein the rotor blades move input material against the plurality of strike plates.

2 Claims, 6 Drawing Sheets

IMPACT MILL WITH STRIKE PLATES

BACKGROUND

1. Field of the Invention

The present invention relates generally to mill systems, and more specifically to a mill system that incorporates strike plates for material size reduction, thereby increasing efficiency and cost effectiveness.

2. Description of Related Art

Mill systems are well known in the art and are effective means to grind or pulverize certain materials for material size reduction. Traditionally, hard materials are loaded into a cylindrical machine to be ground by balls or other grinding media upon impact. As the cylindrical machine rotates, balls are tumbled along with the hard materials, with the balls abrading and impacting the hard materials. One of the problems commonly associated with this is the amount of energy needed to rotate these cylindrical machines. In addition, these cylindrical machines require high capital cost such as concrete foundations to withstand the intense vibrations caused by the balls during operation.

Hence, there is a need for improvement in the design and use of mill systems, particularly with regard to accomplishing material size reduction of hard materials cost effectively.

Accordingly, although great strides have been made in the area of mill systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
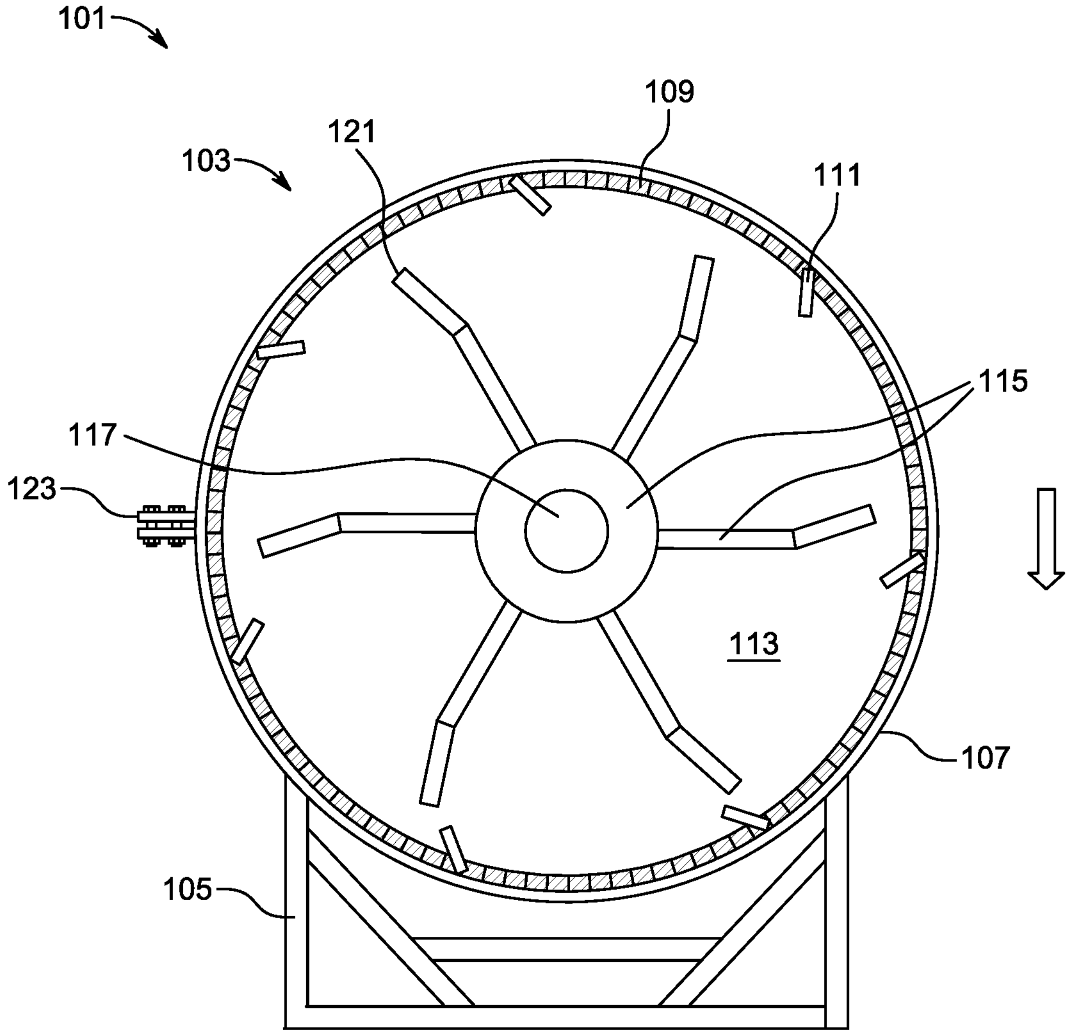
FIG. 1 is an internal front view of a mill system in accordance with a preferred embodiment of the present invention.
Figure 2:
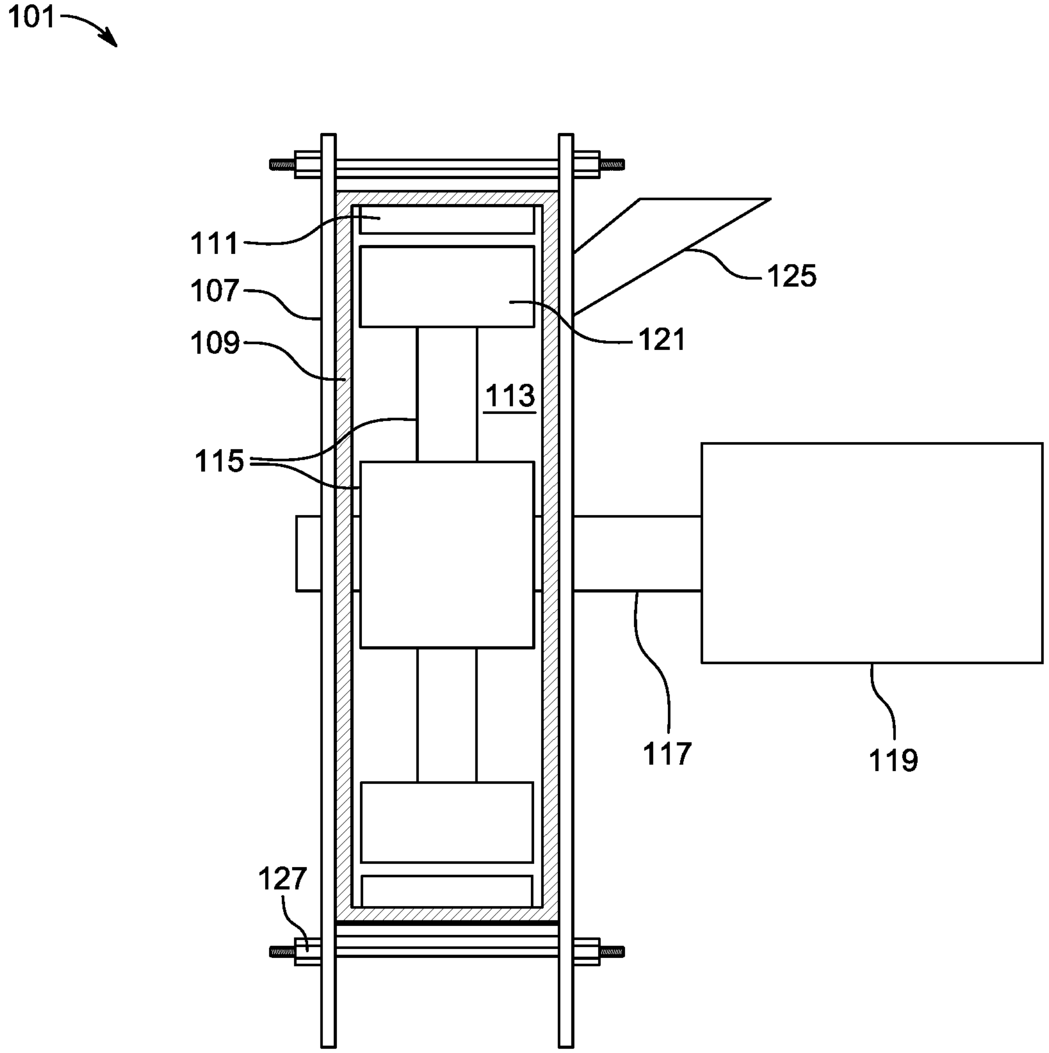
FIG. 2 is an internal profile view of the mill system of FIG. 1.
Figure 3:
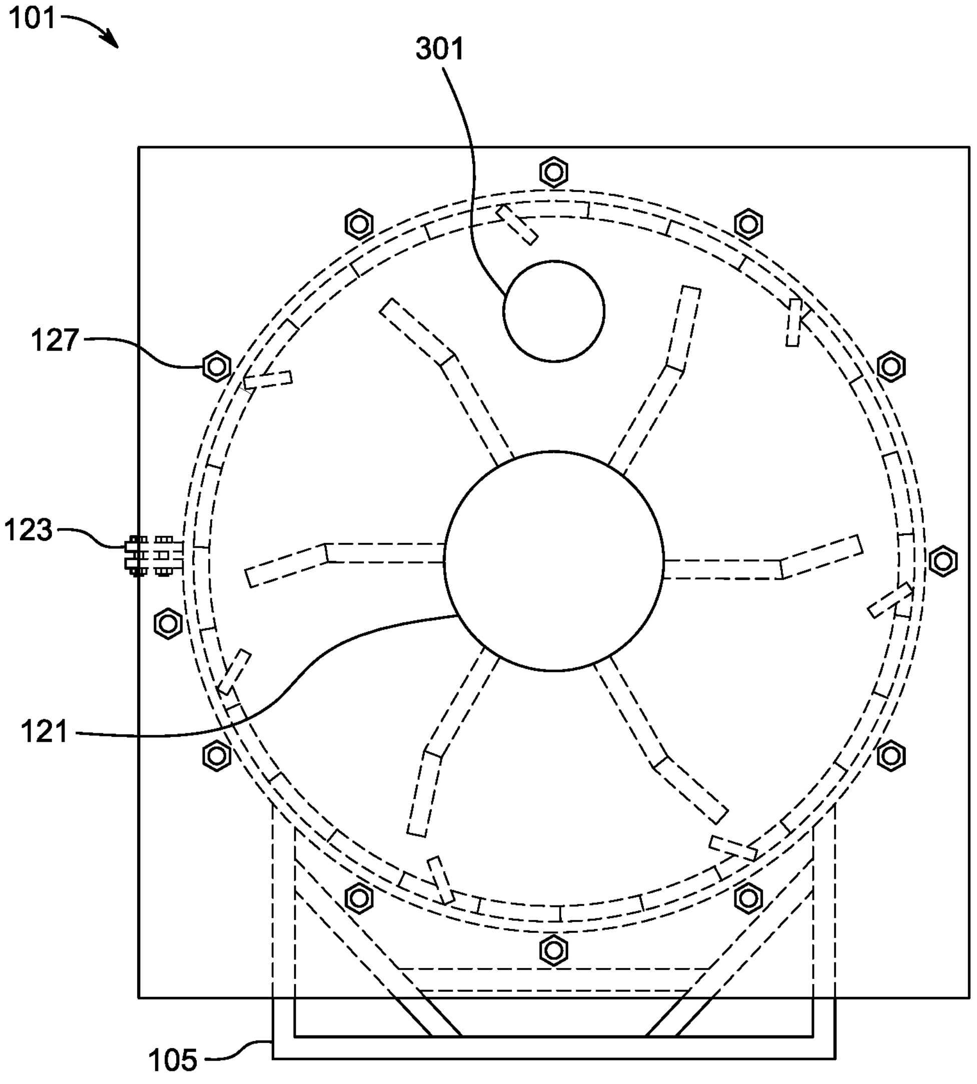
FIG. 3 is a front view of the mill system of FIG. 1.
Figure 4:
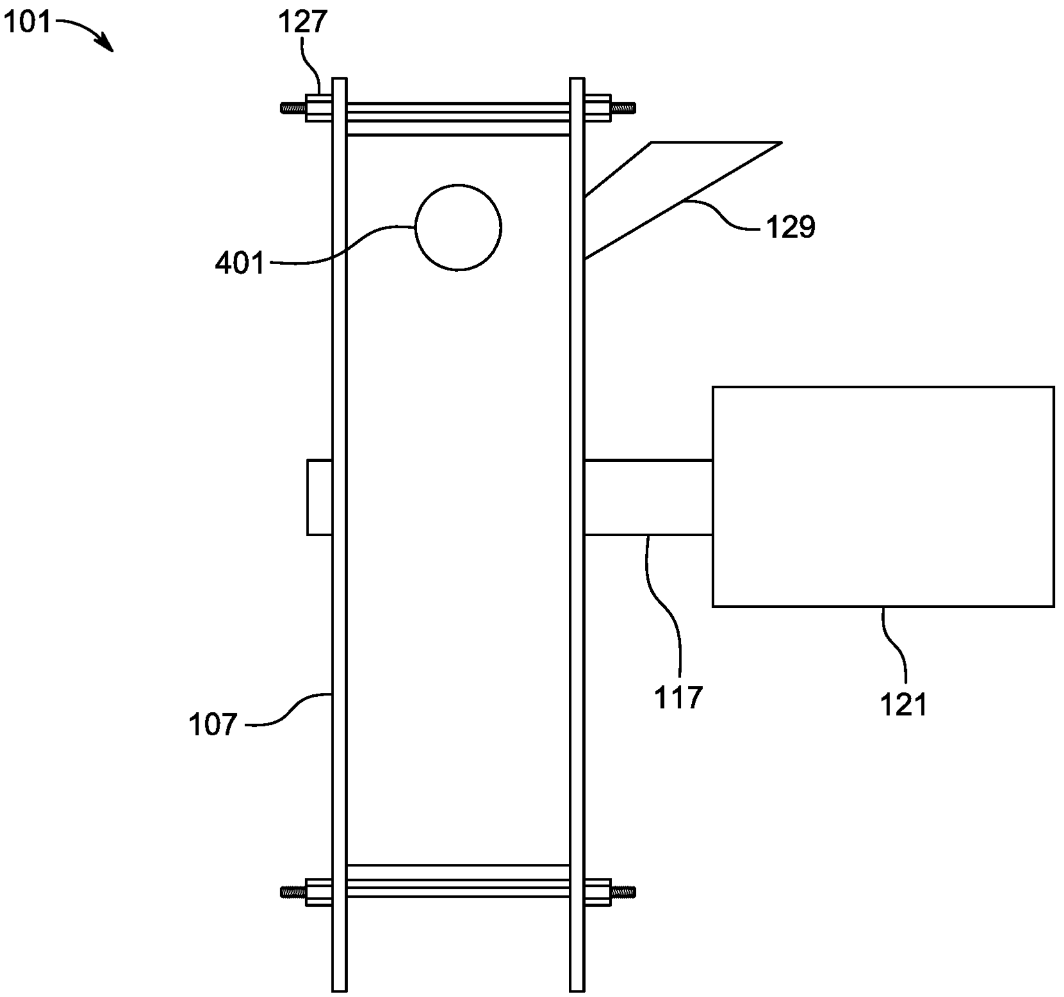
FIG. 4 is a profile view of the mill system of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional mill systems. Specifically, the present invention increases cost effectiveness specifically associated with material size reduction of hard materials during mill operations. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Reference in the specification to "input material" means material that is targeted for particle size reduction. Material may include, without limitation, minerals, ores, coal, glass, steel slag, clay, fly ash, etc.

Referring now to the drawings wherein like reference characters identify corresponding or similar elements throughout the several views, FIGS. 1 through 4 depict various views of a mill system in accordance with a preferred embodiment of the present application. It will be appreciated that the mill system 101 overcomes one or more of the above-listed problems commonly associated with conventional mill systems. In addition, it should be appreciated that the mill system 101 may vary based on aesthetical, functional, or manufacturing considerations.

In the contemplated embodiment, the mill system 101 includes a housing 103 in which input material to be reduced in particle size (not shown) is disposed therein. The mill system 101 also includes a base 105 configured to support the housing 103 thereon and configured to rest on a ground or work surface (not shown).

The housing 103 includes an outer wall 107, an interior layer 109, a plurality of strike plates 111, one or more bolted flanges 123, and a plurality of rods and bolts 127. The strike plates 111 couple to the interior layer 109. The housing also includes a cavity 113 defined by the outer wall 107 and the interior layer 109. The bolted flanges 123 couple to the outer wall 107. The rods and bolts 127 secure and hold the structural integrity of the housing 103.

It should be appreciated that the outer wall 107 may be made from any material, preferably steel. In addition, it should be appreciated that the interior layer 109 may be made from any material, preferably ceramic tile.

In some embodiments, it should be appreciated that the strike plates 111 may couple directly to the interior layer 109. In addition, the strike plates 111 may be integrally formed as part of the housing 103 or may be separately formed and engaged therewith (e.g., by adhesives or cements; by welding, brazing, soldering, or other fusing techniques; by mechanical connectors; etc.).

It should also be appreciated that the strike plates 111 may be made of any hard substance suitable to withstand the impacts from the input material including, without limitation, steel, abrasion resistant steel, ceramic, steel coated ceramic, tungsten carbide, steel coated with tungsten carbide, etc.

The mill system 101 also includes a rotor 115 having one or more rotor blades 121, a drive shaft 117, and a motor 119. The rotor blades 121 extend the rotor 115 into the cavity 113. The rotor 115 couples to the motor 119 via the drive shaft 117. The motor 119 is configured to drive the drive shaft 117 to rotate the rotor 115.

The mill system 101 further includes a feed input chute 125, a feed portal 301, and a product exit portal 401. It should be appreciated that during use, when a user adds input material into the feed input chute 125, the input material travels down the feed input chute 125, through the feed portal 301, and into the cavity 113. Once the input material is in the cavity 113, the rotor blades 121 push the input material to be reduced in size against the strike plates 111. The impact on the strike plates 111 reduces the material size of the input material. It should be appreciated that the amount of size reduction of the input material is dependent on numerous variables including, without limitation, the type and size of the input material, the rotational velocity, configuration of the rotor blades, configuration of the strike plates, etc. Upon reaching the desired material size reduction, the input material exits the housing 103 via the product exit portal 401. It should be appreciated that although the product exit portal 401 is shown on the top of the housing 103, it is contemplated that the product exit portal 401 may vary in location, size, style and the like.

Figure 5:
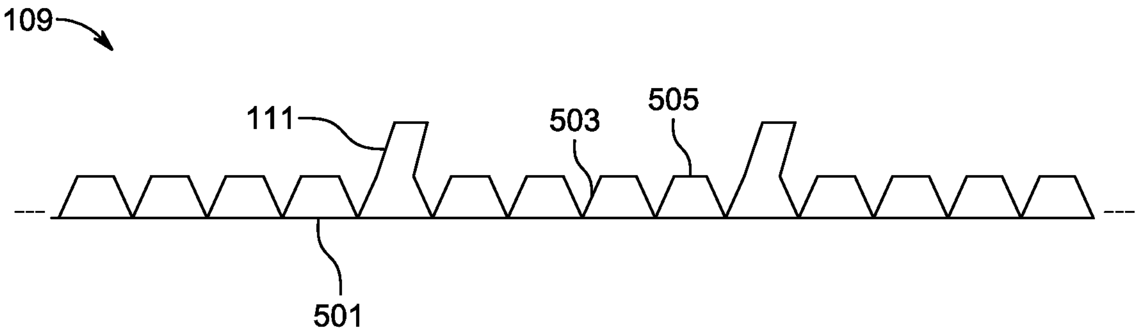
FIG. 5 is a cross-sectional view of the interior layer of FIG. 1.

Referring now to FIG. 5, a cross-sectional view of the interior layer 109 is illustrated. As shown, the interior layer 109 includes a flexible mat 501, a plurality of bevels 503, and a plurality of tiles 505. The bevels 503 couple to the flexible mat 501. The tiles 505 are configured to protect the interior layer 109. The bevels 503 are configured to position the tiles 505 tightly against each other such that the tiles 505 have no gap therebetween. It should be appreciated that the tiles 505 may be made from any material, preferably high alumina ceramic material. In some embodiments, the tiles 505 contain at least 90% alumina. In preferred embodiments, the tiles 505 contain at least 96% alumina or greater.

Figure 6:
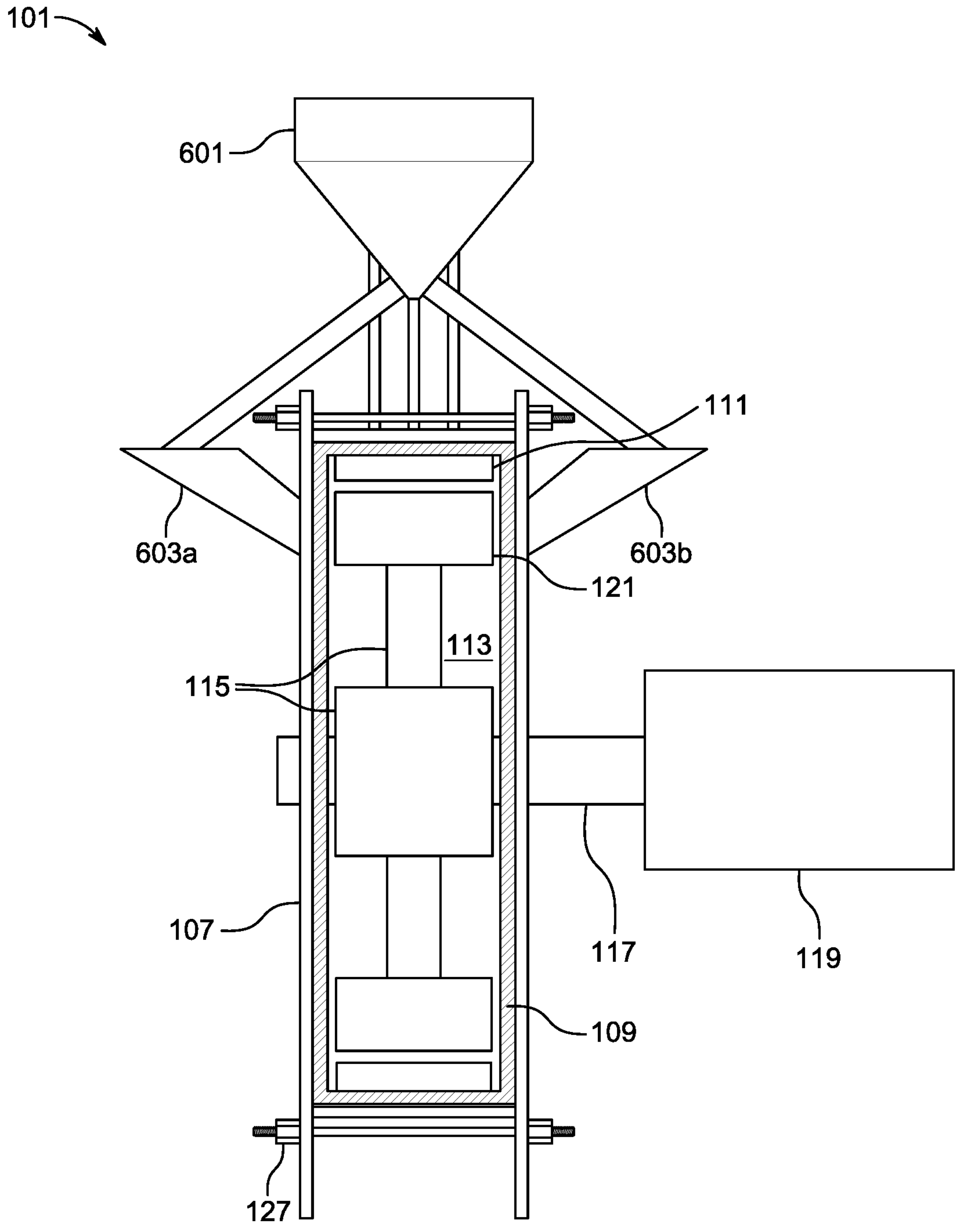
FIG. 6 is an internal profile view of the mill system of FIG. 1 having a hopper in accordance with one or more embodiments of the present invention.
Figure 7:
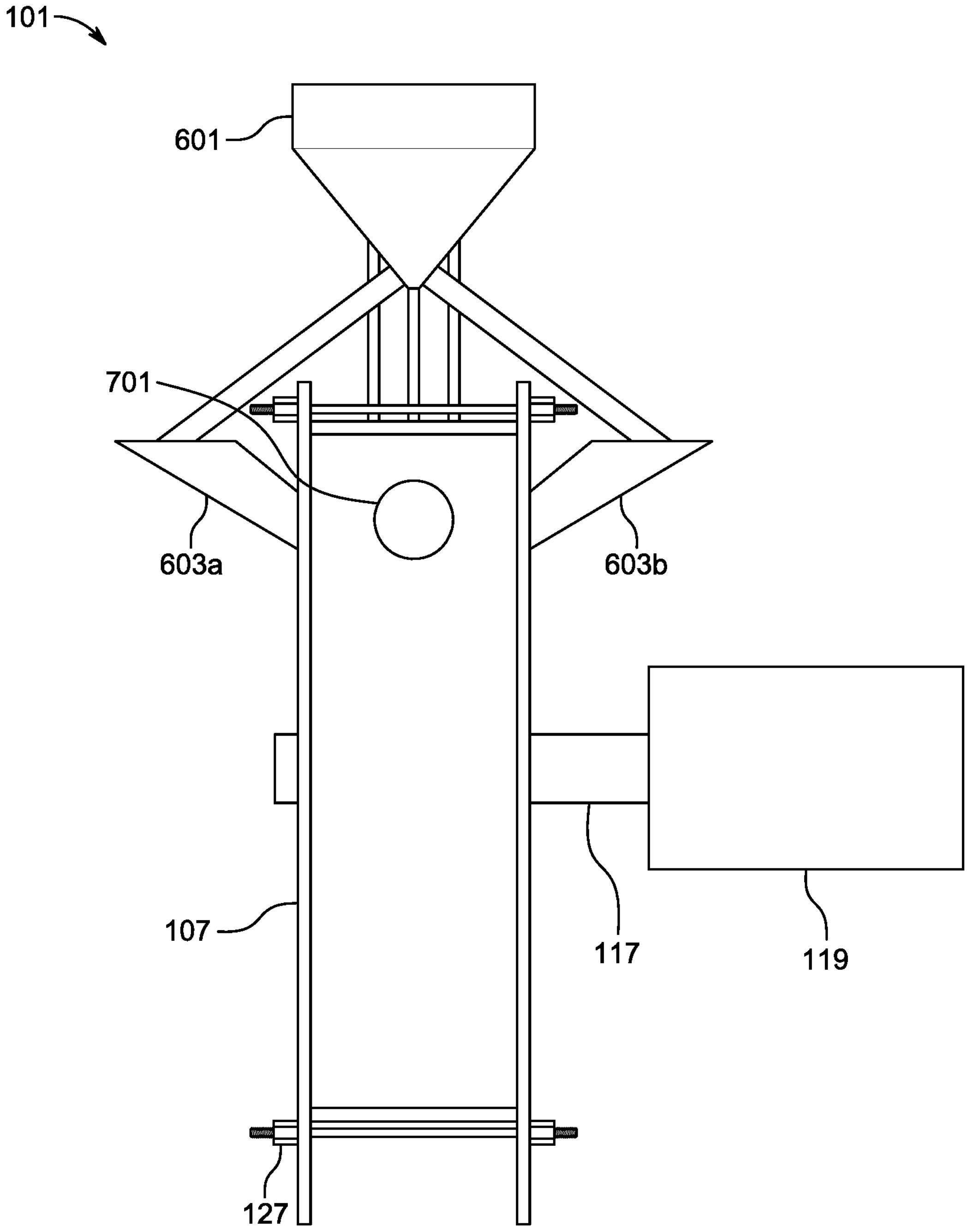
FIG. 7 is a profile view of the mill system of FIG. 1 having a hopper in accordance with one or more embodiments of the present invention.

Referring now to FIGS. 6 and 7, various views of the mill system 101 having a hopper 601 are illustrated. As shown, the hopper 601 is in communication with one or more feed input chutes, for instance, feed input chutes 603*a*, 603*b*. It should be appreciated that the hopper 601 increases grinding capability. In addition, it should be appreciated that the hopper 601 allows for wear to be even on the rotor blades 121.

It should also be appreciated that one of the unique features believed characteristic of the present application is the use of tiles and strike plates within the interior layer which provides for wear protection against harder input material, thereby extending the lifespan of the mill system equipment.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mill system for reducing a size of input material, the mill system comprising:

a stationary housing that defines a cavity with a circumferential perimeter, the housing having:

an outer wall having an inner surface; and an interior layer that extends over the inner surface of the outer wall about the circumferential perimeter of the cavity, wherein the interior layer comprises a flexible mat, a plurality of tiles, and a plurality of strike plates;

wherein the plurality of tiles are secured to and extend from the flexible mat, wherein the plurality of tiles are composed of ceramic material, wherein the plurality of tiles have top surfaces that are spaced from the flexible mat and are positioned relative to each other via a plurality of first bevels, and wherein the plurality of first bevels define tapered structures that taper away from the flexible mat and interface to one another with no gaps between the plurality of tiles in a direction extending about the circumferential perimeter of the cavity when the interior layer extends over inner surface of the outer wall; and wherein the plurality of strike plates are composed of the ceramic material and are secured to and extend from the flexible mat, wherein each strike plate of the plurality of strike plates extends from the flexible mat between a pair of tiles beyond the top surfaces of the pair of tiles, and wherein each strike plate has second bevels that define a tapered structure that tapers away from the flexible mat and interface to the pair of tiles with no gaps between the strike plate and the pair of tiles in the direction extending about the circumferential perimeter of the cavity when the interior layer extends over inner surface of the outer wall;

wherein the plurality of tiles, and the plurality of strike plates are positioned on the flexible mat in a repeated pattern;

a base configured to support the housing thereon and configured to rest on a ground surface;

a rotor having one or more rotor blades;

a drive shaft secured to the rotor; a motor secured to the drive shaft and configured to rotate the rotor;

a feed input chute configured to intake the input material; a feed portal configured to connect the feed input chute and the cavity; and a product exit portal configured to allow the input material to exit therefrom;

wherein the one or more rotor blades are configured to move the input material against the plurality of strike plates and the plurality of tiles when the rotor is rotated.

2. A method of reducing the size of the input material, the method comprising:

providing the mill system of claim 1;

inserting the input material into the feed input chute; allowing the input material to travel from the feed input chute, through the feed portal, and into the cavity; powering the drift shaft to rotate the rotor via the motor;

allowing the one or more rotor blades to move the input material against the 3/10 plurality of strike plates within the cavity; and allowing the input material to exit from the product exit portal.

* * * * *